United States Patent [19]

Lehmann

[11] Patent Number: 4,677,865
[45] Date of Patent: Jul. 7, 1987

[54] PIPE PIG WITH RUNNING GEAR

[75] Inventor: Peter Lehmann, Hilden, Fed. Rep. of Germany

[73] Assignee: Mannesmann Aktiengesellschaft, Dusseldorf, Fed. Rep. of Germany

[21] Appl. No.: 726,778

[22] Filed: Apr. 24, 1985

[30] Foreign Application Priority Data

May 24, 1984 [DE] Fed. Rep. of Germany ....... 3419683

[51] Int. Cl.[4] .......................................... G01M 19/00
[52] U.S. Cl. .................................. 73/866.5; 104/138.2;
 33/302; 378/60; 358/100
[58] Field of Search ............ 73/432 G, 40.5 R, 432 B,
 73/623, 432 R, 432.1, 865.8, 866.5; 33/1 H, 302,
 318, 141 G, 341, 529, 125 B; 378/60, 163;
 358/100, 98, 107; 105/365; 104/138 G, 138 R,
 287, 295, 296, 297, 154, 155, 156, 138.1, 138.2;
 324/220

[56]  References Cited

U.S. PATENT DOCUMENTS

| 2,601,248 | 6/1952 | Brenholdt | 73/40.5 R X |
| 3,400,574 | 9/1968 | Cramer | 33/1 H X |
| 3,460,028 | 8/1969 | Beaver et al. | 324/220 |
| 3,547,040 | 12/1970 | Baran | 378/60 X |
| 3,718,978 | 3/1973 | Van Loevering et al. | 138/97 X |
| 3,794,340 | 2/1974 | Tartabini et al. | 104/138 G X |
| 3,862,578 | 1/1975 | Schlüter | 73/432 B |
| 3,885,091 | 5/1975 | Fish et al. | 358/100 |
| 3,968,568 | 7/1976 | Jackson | 33/141 G |
| 4,066,021 | 1/1978 | Helm | 105/365 X |
| 4,113,202 | 9/1978 | Ueno | 104/138 R X |
| 4,131,018 | 12/1978 | Müller et al. | 73/432 B |
| 4,272,984 | 6/1981 | Bell | 138/93 X |
| 4,524,526 | 6/1985 | Levine | 33/302 X |

FOREIGN PATENT DOCUMENTS

| 0085504 | 8/1983 | European Pat. Off. |  |
| 1064100 | 8/1959 | Fed. Rep. of Germany | 358/100 |
| 2263485 | 5/1973 | Fed. Rep. of Germany |  |
| 2264988 | 11/1975 | Fed. Rep. of Germany |  |
| 3123376 | 1/1983 | Fed. Rep. of Germany | 138/97 |
| 3229441 | 2/1984 | Fed. Rep. of Germany |  |
| 3342145 | 5/1984 | Fed. Rep. of Germany |  |
| 2418849 | 9/1979 | France | 138/97 |
| 66221 | 6/1977 | Japan | 104/138 R |
| 50673 | 5/1981 | Japan | 358/100 |
| 2020023 | 11/1979 | United Kingdom | 73/623 |
| 2088554 | 6/1982 | United Kingdom |  |

Primary Examiner—Stewart J. Levy
Assistant Examiner—Tom Noland
Attorney, Agent, or Firm—Oblon, Fisher, Spivak, McClelland & Maier

[57]  ABSTRACT

A pipe pig for traveling through a pipe line is supported on and moved by two or three runners, which also can move circumferentially on the inside of the pipe to alter the angular position of the runners with respect to the longitudinal axis of the pipe. In this way the runners, which support the pipe pig by contact with the inside surface of the pipe, may rotate so as to avoid obstructions as they are encountered. Such obstructions may take the forms of openings in the pipe wall or protrusions into the pipe from the pipe wall. Various devices may be used to detect the presence of such obstacles and to detect both the axial position and angular orientation of the pig within the pipe. The apparatus for changing the angular position of the runners may be integrated with or separate from the apparatus for moving the pig axially in the pipe.

13 Claims, 3 Drawing Figures

PIPE PIG WITH RUNNING GEAR

BACKGROUND OF THE INVENTION

1. Field of the Invention

The invention relates to a pipe pig with at least two running legs placed symmetrically around the longitudinal axis of the pig to travel through a pipe line to perform inspection or preparation tasks.

2. Description of the Prior Art

During assembly or reexamination of power plant pipe lines, examination of welding seams, visual checking and other inspection is necessary. As a rule these pipe lines are not accessible from the outside, so that these operations can be performed only by use of a pig on the inside of the pipe line. Difficulties often occur, e.g., at such places in the pipe lines where weld-in flanges (such as item 3 in FIGS. 1 and 2) are present and the pipe inside surface correspondingly exhibits a hole, or where objects (e.g., temperature measuring sleeves) project into the pipe. Such irregularities of the inside surface of the pipe represent obstacles for the passage of a pipe pig supported on the inside pipe surface on running legs or other runners, since the runners can, for example, fall into such a hole of a weld-in flange and then not permit further travel of the pipe pig.

To reduce this drawback, it is known from DE-OS No. 32 24 498, to provide a pipe pig with three runners disposed about the pig at angles of 120° and to provide each of the runners with two pairs of rollers arranged in tandem. Thus, it is possible, without any problem, to travel over weld-in flanges (e.g., measuring sleeves) whose diameter is clearly less than the diameter of the pipe line being traveled through. However, in the case of larger weld-in flanges, such a pipe pig can no more be used than in the case of a pipe line in which objects project into the inside of the pipe.

SUMMARY OF THE INVENTION

It is an object of the invention to provide a pipe pig in such a way that even weld-in flanges, whose diameter is up to about 80% of the diameter of the pipe line being traveled through, and other obstacles can be traveled over without any problem.

The invention is based on the concept of designing the pipe pig so that it can rotate around its longitudinal axis and thus be brought to a desired angular position at any place in a pipe line. This angular position is determined in each case by the position of the weld-in flanges to be traveled over or of any other obstacle on the pipe inside surface. The pipe pig, before traveling over the obstacle, is rotated so that to the extent possible the obstacle is in the middle between two adjacent runners, and thus the runners pass by the obstacle (e.g., hole) of the inside pipe surface.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
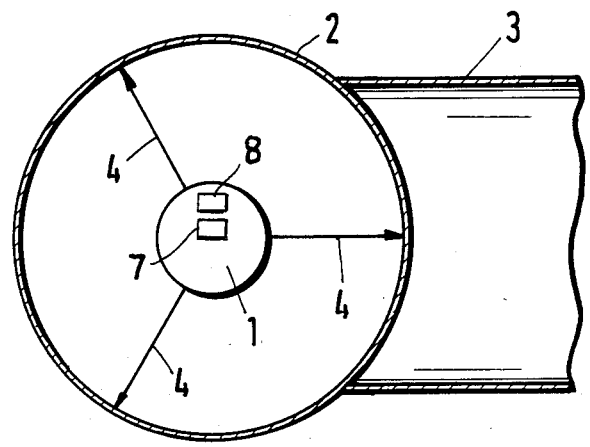
FIG. 1 diagrammatically illustrates a pipe pig with three runners while traveling over a weld-in flange located in improper angular postion with respect to one of the runners.

Referring now to the drawings, there is shown a pipe line 2 with a weld-in flange 3 in section. Pipe line 2 is traveled through by a pipe pig 1, which is supported on the inside surface of pipe 2 by three runners 4 placed symmetrically about the pig 1 at angles of 120° and diagrammatically indicated by arrows. In relation to weld-in flange 3, at whose mouth the inside surface of pipe 2 exhibits a corresponding opening, pipe pig 1 has an angular position which, in traveling over the weld-in flange, would result in a runner falling into the opening, thereby impeding the travel of pipe pig 1.

Figure 2:
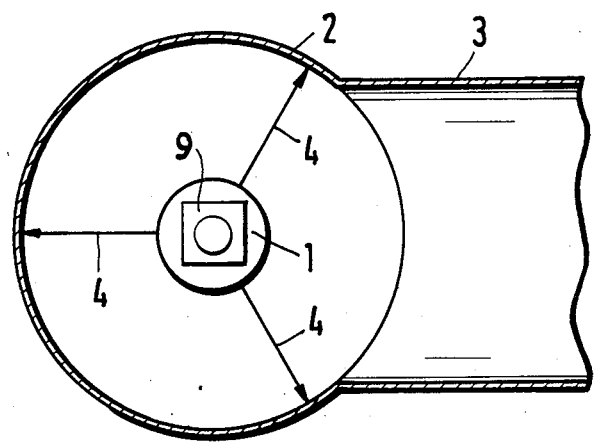
FIG. 2 illustrates the pipe pig of FIG. 1 in proper angular position.

On the other hand, in FIG. 2, pipe pig 1 is in an angular position which allows traveling over the weld-in flange without any problem; weld-in flange 3 is exactly between two runners 4. In this position, pipe pig 1 without any difficulty can travel by its three runners 4 over weld-in flange 3, whose diameter can be up to about 80% of the diameter of the pipe line 2 being traveled through.

To be able to travel over such obstacles safely, it is necessary to bring pipe pig 1 in a timely manner to a suitable angular position for the particular obstacle. For this purpose, it must be possible to recognize this angular position, first of all before traveling over the obstacle—in other words, as a function of the position of the pipe pig in the axial direction of pipe line 2. This can be done in the most varied ways, for example, by mechanical, optical (e.g., television camera, glass fiber cable), acoustical or electronic scanning devices. The angular position can be determined with particular advantage using a gyro system 7 installed in pipe pig 1 (FIG. 1). The position in the axial direction of pipe line 2 can easily be determined in the case of a pulled pig 1 by the length of the traction rope that is still out. But it can also be established (e.g., in the case of pipe pigs with motor drive) with a radioactive position emitter or with a displacement transducer illustrated schematically in FIG. 1 as element 8. The axial position and the angular position can be followed simultaneously with a television camera 9 on the head of the pipe pig (FIG. 2). A multiplicity of various possibilities of solution, as already indicated, can be imagined for these tasks.

If, when traveling through pipe line 2, a weld-in flange 3 or a corresponding obstacle is detected, or if on the basis of the measured position of pipe pig 1 and the known geometry of pipe line 2 it is clear that pipe pig 1 is in front of such an obstacle, then the necessary angular position of pipe pig 1 is set in relation to the obstacle by an angular positioning device that makes a self-rotation of pipe pig 1 possible.

Figure 3:
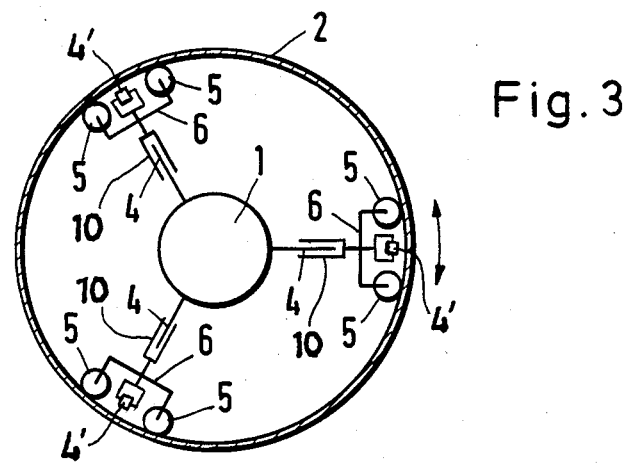
FIG. 3 illustrates a pipe pig according to the invention with means for setting the angular position.

This device 6 can be embodied, e.g., as shown in FIG. 3, by additional rollers or wheels 5, which are integrated into runners 4. Wheels 5 are pressed on the inside surface of pipe 2, e.g., with a pneumatic cylinder, illustrated schematically as cylinder 10, while at the same time the wheels 4' of runners 4, which see to the advance, are lifted from the inside surface or at least relieved of pressure. Then, wheels 5 are driven until pipe pig 1 has reached the desired angular position. Finally, the wheels for the axial advance are again pressed down, while wheels 5 are retracted. Thus, pipe pig 1 can continue its travel.

According to another embodiment of the invention, runners 4 for the axial progression of pipe pig 1 and angular positioning devices 6 with wheels 5 for self-rotation can even be completely separated from one another. Finally, it is also possible to make runners 4 rotatable around an axis normal to the longitudinal axis of pipe pig 1 (i.e., around the arrows shown in FIGS. 1 to 3), or the axes of the individual rollers or wheels of runners 4 may be designed to swivel correspondingly. In this case, the required angular position of the pipe pig can also be set during its axial advance.

It is sufficient if a pipe pig 1 according to the invention exhibits two runners 4 for the axial advance, which in this case must be placed diametrically opposite one another. However, with particular advantage in regard to its stable alignment, pipe pig 1 has three running gears set at 120° to each other as shown in FIG. 3. A greater number of runners is possible, but superfluous.

The principle according to the invention is not only applicable in the case of individual pipe pigs, with or without self-drive for advance, but also in the case of multimember pipe pigs (e.g., connection by universal joints).

The pipe pig made according to the invention offers the great advantage of allowing inspection or preparation of pipe lines on the inside of pipes which are not accessible and which cannot be traveled through by the usual pipe pigs because of irregularities of the inside surfaces. Thus a limitation of pipe line inspection examination methods acting only on the outside, and which therefore are less accurate, no longer exists.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pipe pig for axial movement in a pipe line comprising:
a main body having a longitudinal axis;
at least two runners extending outwardly from said main body for supporting said main body on an inside surface of a pipe line, said at least two runners being disposed at different locations around the longitudinal axis of said main body, said at least two runners comprising means for contacting the inner surface of the pipe line for axial movement therein and for driving said runners in rotation about said longitudinal axis of said main body to any angular position about said longitudinal axis with respect to the pipe line, said at least two runners supporting said main body at all said angular positions, wherein said runners extend outwardly from said main body in directions substantially radial with respect to said longitudinal axis, and wherein at least one of said runners can rotate about an axis thereof normal to said longitudinal axis and oriented in said substantially radial direction; and
means on said pipe pig for detecting the axial and angular positions of the pipe pig within the pipe line.

2. A pipe pig as claimed in claim 1, wherein said means for detecting the angular position comprises a gyro system.

3. A pipe pig as claimed in claim 1, wherein said means for detecting the axial position comprises a radioactive position emitter.

4. A pipe pig as claimed in claim 1, wherein said means for detecting the axial and angular positions further comprises at least a television camera.

5. A pipe pig for axial movement in a pipe line comprising:
a main body having a longitudinal axis;
at least two runners extending outwardly from said main body for supporting said main body on an inside surface of a pipe line, said at least two runners being disposed at different locations around the longitudinal axis of said main body, said at least two runners comprising means for contacting the inner surface of the pipe line for axial movement therein and for driving said runners in rotation about said longitudinal axis of said main body to any angular position about said longitudinal axis with respect to the pipe line, said at least two runners supporting said main body at all said angular positions, wherein said runners extend outwardly from said main body in directions substantially radial with respect to said longitudinal axis, and wherein said means for contacting the inner surface of the pipe line of at least one of said runners comprises rolling means pivotable about its own axis and further pivotable about an axis normal to said longitudinal axis and oriented in said substantially radial direction; and
means on said pipe pig for detectig the axial and angular positions of the pipe pig within the pipe line.

6. A pipe pig as claimed in claim 5, wherein said means for detecting the angular position comprises a gyro system.

7. A pipe pig as claimed in claim 5, wherein said means for detecting the axial position comprises a radioactive position emitter.

8. A pipe pig as claimed in claim 5, wherein said means for detecting the axial and angular positions further comprises at least a television camera.

9. A pipe pig for axial movement in a pipe line comprising:
a main body having a longitudinal axis;
at least two runners extending outwardly from said main body for supporting said main body on an inside surface of a pipe line, said at least two runners being disposed at different locations around the longitudinal axis of said main body, said at least two runners comprising means for contacting the inner surface of the pipe line for axial movement therein and for driving said runners in rotation about said longitudinal axis of said main body to any angular position about said longitudinal axis with respect to the pipe line, said at least two runners supporting said main body at all said angular positions, wherein said means for contacting the inner surface of the pipe line comprises first contacting means for providing said axial movement of said pipe pig and second contacting means for rotating said runners about said longitudinal axis, said pipe pig further comprising means for lifting said first contacting means from the inside surface of the pipe and causing said second contacting means to contact the inside surface of the pipe; and means on said pipe pig for detecting the axial and angular positions of the pipe pig within the pipe line.

10. A pipe pig as claimed in claim 9, wherein said means for detecting the angular position comprises a gyro system.

11. A pipe pig as claimed in claim 9, wherein said means for detecting the axial position comprises a radioactive position emitter.

12. A pipe pig as claimed in claim 9, wherein said means for detecting the axial and angular positions further comprises at least a television camera.

13. A pipe pig as claimed in claim 9, wherein said second contacting means are integrated into the runners.

* * * * *